Feb. 10, 1953 K. F. SCHULZE 2,627,824
APPARATUS FOR MOLDING AND PACKAGING ICE CREAM
Filed Oct. 21, 1949 2 SHEETS—SHEET 1

INVENTOR.
KARL F. SCHULZE
BY
Paul, Paul + Moore
ATTORNEYS

Feb. 10, 1953 K. F. SCHULZE 2,627,824
APPARATUS FOR MOLDING AND PACKAGING ICE CREAM
Filed Oct. 21, 1949 2 SHEETS—SHEET 2
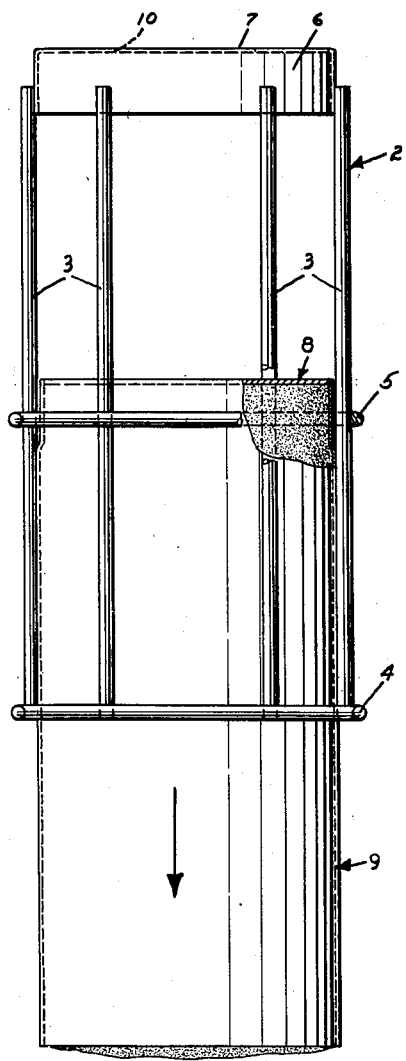
Fig. 4
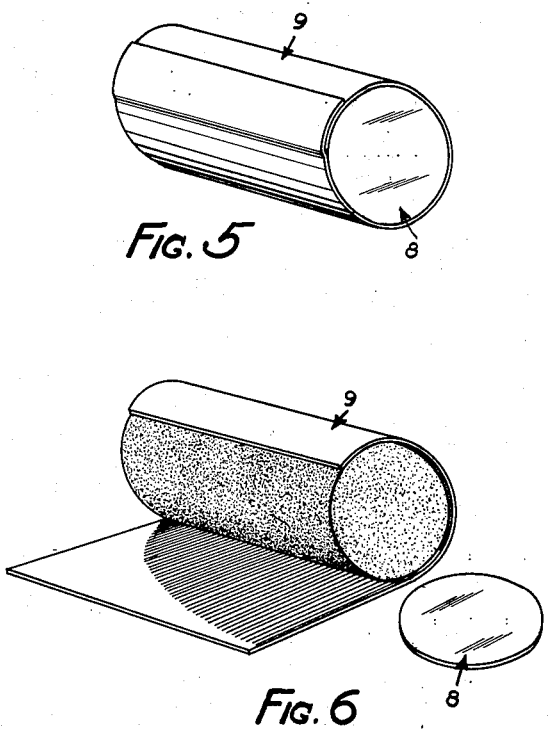
Fig. 5
Fig. 6
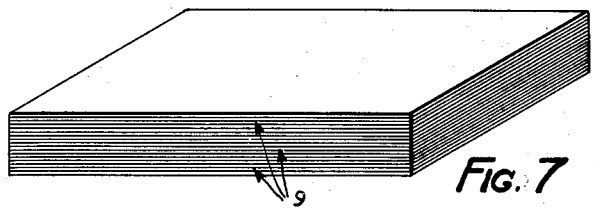
Fig. 7
INVENTOR.
KARL F. SCHULZE
BY
Paul, Paul & Moore
ATTORNEYS Patented Feb. 10, 1953

2,627,824

UNITED STATES PATENT OFFICE 2,627,824

APPARATUS FOR MOLDING AND PACKAGING ICE CREAM

Karl F. Schulze, Minneapolis, Minn.

Application October 21, 1949, Serial No. 122,766

4 Claims. (Cl. 107—19)

This invention relates to a new and improved method of and apparatus for molding and packaging ice cream into small portions suitable for delivery to the retail trade, and more particularly to a new and novel device adapted for use in the operation of molding ice cream into predetermined shapes, such as quart size rolls, whereby the ice cream may be handled in a more sanitary and expeditious manner than has heretofore been possible.

In the past, numerous methods and apparatus have been employed in the packaging of ice cream to provide an attractive and readily saleable package. A very popular form of package now meeting with considerable success is the well known ice cream roll, which is usually made in quart size, and coated with ground nut meats, or other crunchy coating materials, well known in the industry.

Metallic and paper containers are now used in the formation of ice cream rolls, and the like. These containers usually have imperforate walls, but not always, and are filled with a plastic ice cream mix and placed in a freezing chamber until the ice cream has become solidified or frozen. The filled containers are then removed from the freezing chamber and the frozen body of ice cream in each container is then removed therefrom for further treatment, as may be required to complete the preparation of the ice cream for distribution to the trade.

Because of the integral construction of the container now commonly employed in operation of molding the ice cream into the desired shapes, the task of removing the frozen body of ice cream from each container always presents a problem. When using the usual form of paper containers, the operator usually slits the cylindrical wall of the container the length thereof and then spreads the several wall portions to free the frozen body of ice cream from the container walls. This requires considerable handling of the container, and should the ice cream tend to adhere to the container wall, the job of removing the ice cream from the container and applying a coating material thereto can indeed become a tedious and unsanitary task.

When utilizing metallic containers, it is customary to momentarily immerse the container in warm water to warm the walls sufficiently to release the frozen body of ice cream therefrom. It is also customary for the operator to run a knife blade around between the wall of the container and the body of ice cream to make sure that the frozen ice cream may be removed from the container without damaging or disfiguring the frozen roll.

The use of conventional containers, as above described, is costly, particularly paper containers, because they can be used but once, and are discarded or disposed of after use. The original cost of such containers is high as compared to the cost of blanks of parchment or liner paper, as herein disclosed, and they are also unsanitary to handle. The usual metallic containers or cans are also expensive to use because of the labor required to remove the frozen ice cream therefrom, and they are also objectionable for sanitary reasons.

The novel method of molding and packaging ice cream, as herein disclosed, requires the use of one or more open forms or frames, preferably constructed of a plurality of vertically disposed wire or metallic rods, and each form having a liner inserted therein, usually in the form of a flat sheet of moisture resistant material, such as parchment paper. This sheet is so sized that when coiled upon itself and placed within the open form, it will expand and engage the vertically disposed rods thereof, with its opposed edges overlapped, thus providing, in effect, an imperforate cylindrical wall for the mold or form, which may readily be withdrawn from the form with the frozen ice cream, when the container is subsequently removed from the freezing chamber.

An important object of the present invention therefore is to provide a new and improved method of molding ice cream into small rolls for retail trade, whereby the operation of thus molding the ice cream into saleable portions may be accomplished in a highly efficient, expeditious, and sanitary manner.

A further and more specific object of the invention is to provide an open form or frame, preferably constructed of a heavy gauge wire or rod-like material, comprising a plurality of vertically disposed rods spaced apart circumferentially of the frame and having upper and intermediate annular members surrounding said rods and secured thereto, and a bottom member being secured to the bottom ends of the rods and having an inwardly projecting portion forming an annular shoulder or ledge for supporting a paper disk adapted to form an imperforate bottom for the mold or container to be formed, and the vertical wall of the frame being formed by inserting a flexible sheet of moisture resistant material or paper into the open frame which, when released within the frame expands into contact with its upright vertical rods to provide an imperforate cylindrical wall for the frame, thereby providing a container which may be filled with ice cream mix and placed in a freezing chamber to freeze and solidify, whereby the ice cream may be conveniently handled in the subsequent operation of coating the roll with a suitable material, well known in the art.

A further object is to provide an improved device for facilitating the operation of forming ice cream rolls, which comprises an open frame including a plurality of circumferentially spaced vertical rods adapted to be engaged by the liner placed in the holder, which rods serve as guides and greatly facilitate the operation of removing the frozen ice cream roll or bar from the composite container formed by the open frame and liner, in that the holder need not be inserted into water to soften the outer surface of the frozen ice cream, as in the past, in order to remove the ice cream from the holder.

Other objects of the invention reside in the simplicity of the open form or frame whereby the problem of sanitation is reduced to a minimum; in the provision of such a device constructed as an integral unit, all parts and surfaces of which are exposed to view whereby they may readily be inspected for sanitary reasons, when necessary; and in the provision of such an apparatus which readily lends itself for manufacture in quantity at extremely low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 4 is a view showing the mold inverted, as when ejecting the frozen bar of ice cream therefrom;

Figure 5 is a view showing an ice cream roll completely ejected from the mold;

Figure 6 is a view showing a roll of ice cream partially removed from the wall forming liner; and Figure 7 is a view showing a stack of liner blanks prior to being inserted into the open frame to form molds.

Figure 1:
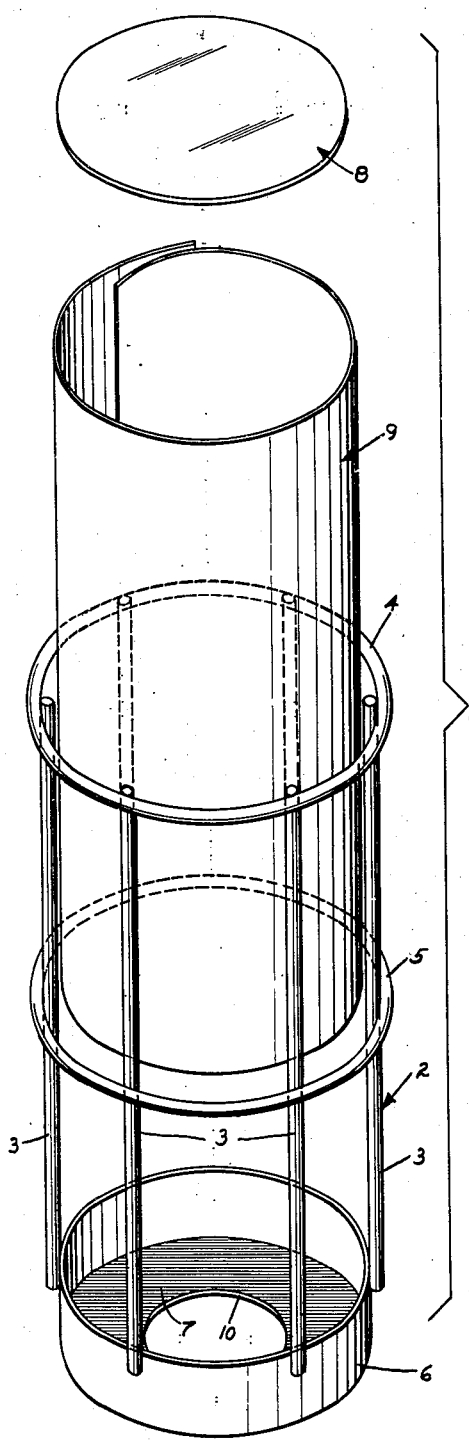
Figure 1 is a view in perspective showing a sheet of flexible waterproof material being inserted into the open frame to provide an imperforate wall therefor.

To carry out the novel method of forming ice cream rolls, and the like, in accordance with the present invention, there is provided an open form of frame, generally designated by the numeral 2 in the application drawings. This frame constitutes an important part of the present invention and is preferably constructed of a plurality of upright rods or wires 3, having their upper ends secured to an annular supporting member or ring 4 and their intermediate portions to a similar member 5. The lower ends of the rods are shown secured to a cup-shaped member 6, which may be formed from sheet metal and has an inwardly extending horizontal flange 7 adapted to provide a support for a paper disk or bottom-forming member 8, shown in Figures 1, 2, 3 and 6.

By reference to Figures 1 and 2, it will be noted that the annular members 4 and 5 encircle the rods 3 and retain them in spaced parallel relation, whereby they cooperate to provide longitudinally extending or vertical guides for engaging the liner 9, when the liner is inserted into the open frame to form the side wall of the mold, as will subsequently be described.

The rods 3, annular members 4 and 5, and cup-shaped bottom member 6 may be secured together by welding, whereby these parts become in effect an integral structure which may readily be handled without danger of becoming distorted, and which readily lends itself to cleaning and sterilizing as is necessary with all equipment with which the ice cream comes in direct contact. The open frame may be made from a suitable rust-proof material or it may be suitably treated or plated to render it rust-proof.

Figure 2:
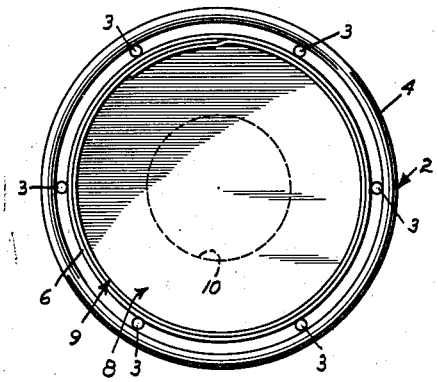
Figure 2 is a top view of the frame showing a liner inserted therein to provide a cylindrical container which is utilized as a mold to form the ice cream rolls.

The liners 9, best shown in Figures 1 and 7, may be made in the form of rectangular blanks of a suitable moisture resistant material such as parchment paper, which may be bundled in packs and wrapped in sanitary wrappers, whereby they may be readily handled without contamination prior to being used in the molding of the ice cream into quart size rolls.

In the operation of forming ice cream rolls, a liner sheet 9 is inserted into the open top of the frame 2, as shown in Figure 1, and when released therein it usually expands into engagement with the rods 3 of the frame. A bottom forming disk 8 is then dropped into the open top of the liner, and if it does not drop freely into position on the horizontal ledge 7, it is forcibly pushed into place thereon by the operator.

Figure 3:
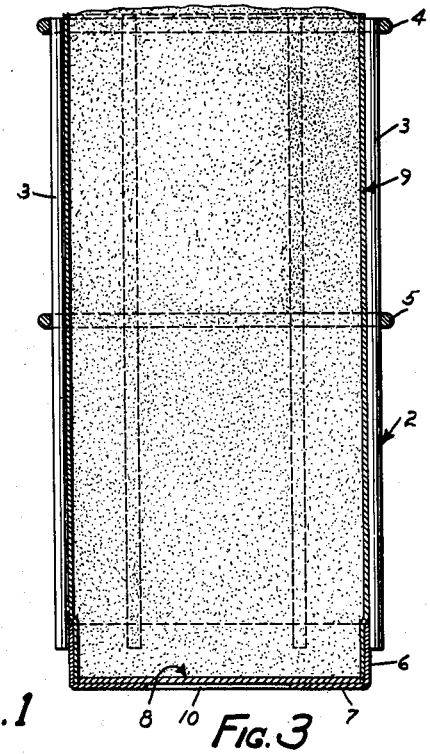
Figure 3 is a vertical sectional view showing a filled mold and illustrating the position of the liner within the frame to form the mold.

When the bottom forming disk 8 and the liner 9 have thus been inserted into the open holder these parts cooperate to provide a composite mold or container having an open top, which may then be readily filled with a plastic ice cream mix, as shown in Figure 3. The filled mold is then placed in a freezing chamber until the ice cream mix contained therein is frozen, or solidified, after which the molds with the frozen ice cream therein are removed from the freezing chamber in preparation to having the ice cream withdrawn or ejected therefrom.

The operation of ejecting the frozen ice cream from the novel mold of the present invention is a comparatively simple one, because the rods 3 of the frame serve as upright guides whereby the liner with the frozen ice cream therein may readily be shoved out of the open frame, as shown in Figure 4, by simply inverting the frame and with the fingers of the two hands engaging the annular member 5, thrusting the thumbs through the opening 10 in the bottom forming member 6 until the disk 8 reaches a position beneath the bottom forming member 6, after which the operator may apply pressure against the bottom disk 8 by inserting his fingers between the rods 3 of the frame, as will be understood by reference to Figure 4.

The parchment paper used in the construction of the liners 9 may be retained in position within the open frame 2 by the disk 8, until subsequently filled with the plastic ice cream mix. When thus filled, the liner is pressed firmly into engagement with the guide rods 3, and the overlapping edge portion of the opposed edges of the liner will prevent any material slippage between said overlapped ends when the plastic material is delivered into the liner. The liner 9 thus remains substantially cylindrical in cross-section, and its exterior surface may not directly engage the horizontal supporting rings or members 4 and 5, as indicated in Figure 2, even when the liner is filled with ice cream.

Thus, when the mold or container, including the open frame 2, liner 9, and disk 8, is removed as a unit from the freezing chamber, and is placed in a room temperature of approximately 65 to 70 degrees, the adhesion between the periphery of the liner and the surfaces of the rods 3 with which it is in direct contact, is quickly released sufficiently to permit the liner and ice cream to be readily and conveniently removed from the open frame 2 without any of the ice cream coming in direct contact with the supporting frame 2, which is a decided advantage over present day equipment, as will be understood.

When the liner filled with ice cream is placed upon a table, as shown in Figure 5, the bottom forming disk 8 may readily be separated from the ice cream, as shown in Figure 6, and the liner 9 may then be stripped from the bar or roll of ice cream by simply rolling the bar of ice cream over the surface of a table, as will be understood. Thereafter, the frozen body or bar of ice cream may be rolled in crushed nut meats, or in any other desired coating material, after which it may be wrapped in suitable wrappers, and placed in a cooler for subsequent distribution to the trade. The liner 9 and disk 8, which are very inexpensive, are discarded after use.

The improved holder herein disclosed has practically revolutionized the operation of molding ice cream into small rolls or bars preparatory to having their exterior surfaces covered with a decorative coating for enhancing the appearance of the product and to improve its palatability. While the invention is more applicable to ice cream molded into small rolls, it is to be understood that it may be used in the packaging of ice cream which may not be so shaped or formed, without departing from the scope of the invention.

By eliminating the usual operation of dipping the container or mold with the frozen ice cream therein into water to partially soften the surface of the ice cream to facilitate removing it from the supporting mold, as is now common practice, it will readily be seen that the operation of applying a coating material to the exterior surfaces of the ice cream bars prior to preparing them for storage for future sale and distribution, may be greatly expedited by the use of this invention.

The present method also presents the utmost in economy in that the simplified form of disposable liner utilized may be obtained at a fraction of the cost of the usual paper containers now commonly utilized by the trade for making ice cream rolls. The open frame 2 is practically indestructible and may readily be cleansed daily by the use of conventional cleaning equipment to maintain it in the necessary sanitary condition.

In actual practice it has been found that by making the open frame 2 slightly larger in diameter at its upper end than at its bottom end, when looking at the frame as shown in Figure 1, the frozen bar or roll of ice cream contained therein when the frame is removed from the freezing chamber may be more readily removed from the frame.

This results because by thus slightly tapering the inside diameter of the frame, the periphery of the liner enclosing the ice cream immediately releases its bonding engagement with the rods or guides 3 of the frame when the latter is inverted to empty the ice cream therefrom, as shown in Figure 4. When so constructed the ice cream bar or roll, including the liner is usually dropped by gravity from the frame 2, once the ice cream roll has been loosened from the frame, and the frame is held in an inverted position, as shown in Figure 4.

The foregoing detailed description has been given for clearness of understanding only, and no unnecessary limitations should be understood therefrom, but the appended claims should be construed as broadly as permissible in view of the prior art.

I claim as my invention:

1. In a device for making ice cream rolls, an open frame comprising a plurality of circumferentially spaced, vertically disposed rods, means encircling said rods and secured thereto to retain them in proper spaced relation, a cylindrical liner sheet removably coiled into said frame with the terminal end overlapping the initial end thereof and engaging said rods, a disk also inserted into the open frame, said liner and disk cooperating to provide a mold for receiving a plastic ice cream mix, and said mold being adapted to be placed in a freezing chamber to thoroughly solidify and harden the ice cream mix contained therein, said rods forming guides to minimize friction and facilitate the removal of the frozen ice cream from the holder.

2. In a device as set forth in claim 1, wherein said vertical guides are in the form of wire rods secured together in fixed relation to provide an integral member.

3. In a device of the class described, a cylindrical frame comprising a plurality of circumferentially spaced, vertically disposed guides, means encircling said guides and secured thereto to retain them in proper spaced relation, a cup-shaped member secured to the bottom ends of the guides and having an annular inwardly projecting flange and an axial aperture therein, a cylindrical liner removably inserted into said open frame and engaging said guides, a disk inserted into the liner and cooperating therewith to provide a mold for receiving a charge of plastic ice cream, said mold being adapted to be placed in a freezing chamber to solidify the ice cream, and said guides extending inwardly into the open frame and engaging the liner, thereby to minimize friction between the liner and said guides and facilitating removal of the frozen ice cream from the frame.

4. In a device as set forth in claim 3, wherein the interior diameter of the frame is slightly larger at its upper end than at its lower end, thereby to minimize friction when the frame is inverted to expel the ice cream therefrom.

KARL F. SCHULZE.

REFERENCES CITED

The following references are of record in the file of this patent:

UNITED STATES PATENTS

| Number | Name | Date |
| --- | --- | --- |
| 1,810,837 | MacElhorne | June 16, 1931 |
| 1,824,359 | Miller | Sept. 22, 1931 |
| 2,005,245 | Stover | June 18, 1935 |
| 2,121,564 | Herron | June 21, 1938 |
| 2,180,298 | Ohlhaver | Nov. 14, 1939 |
| 2,319,384 | Callan et al. | May 18, 1943 |
| 2,347,384 | Watts | Apr. 18, 1944 |
| 2,367,098 | Cole | Jan. 9, 1945 |
| 2,392,789 | Watter | Jan. 8, 1946 |